(No Model.)
E. P. WELLS & E. R. HUBBARD.
TIME RECORDER FOR WATER GAGES.
No. 542,910. Patented July 16, 1895.
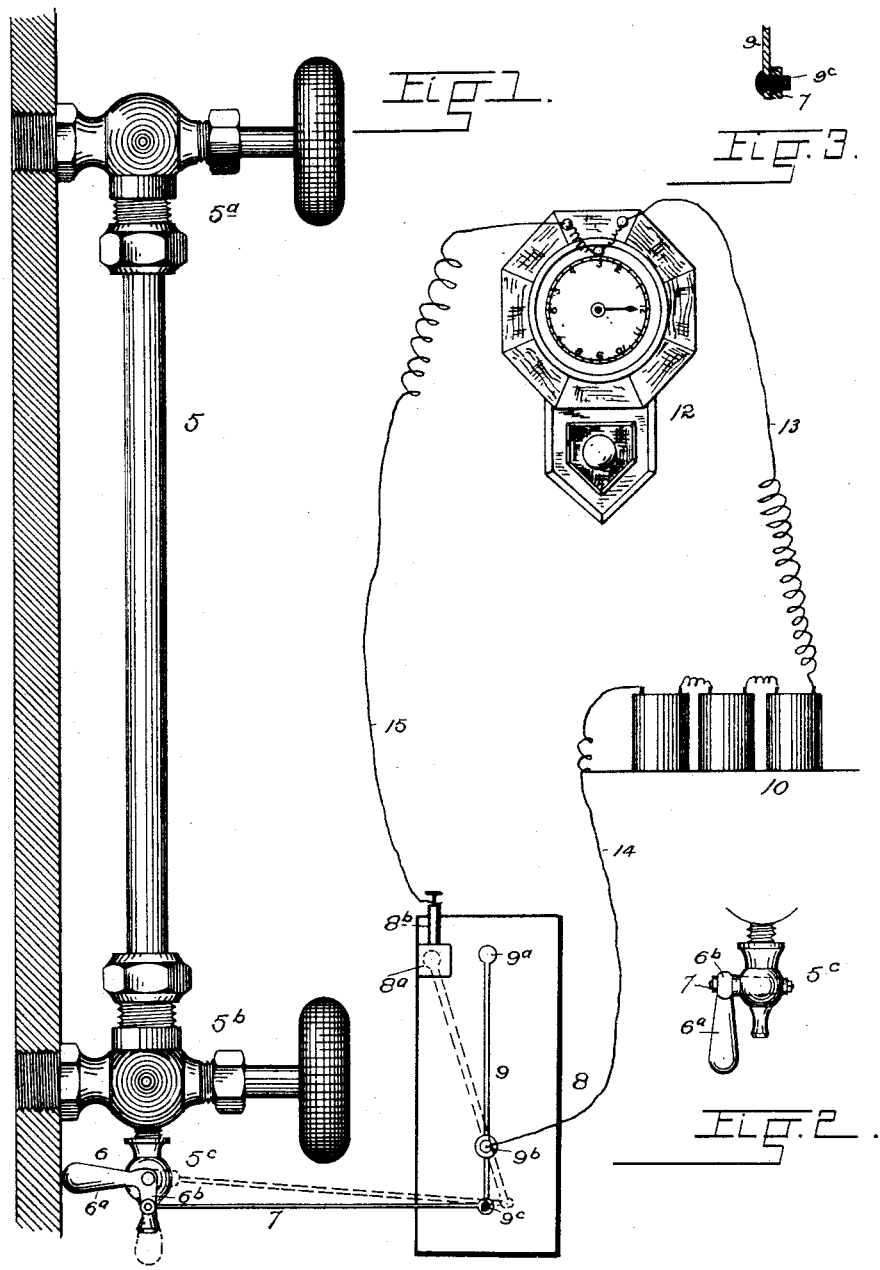
WITNESSES:
INVENTORS
Edward P. Wells
Edward R. Hubbard

UNITED STATES PATENT OFFICE.

EDWARD P. WELLS, OF HIGHLANDS, AND EDWARD R. HUBBARD, OF WALDEN, COLORADO.

TIME-RECORDER FOR WATER-GAGES.

SPECIFICATION forming part of Letters Patent No. 542,910, dated July 16, 1895.

Application filed February 25, 1895. Serial No. 539,592. (No model.)

*To all whom it may concern:*

Be it known that we, EDWARD P. WELLS, residing at Highlands, in the county of Arapahoe, and EDWARD R. HUBBARD, residing at Walden, in the county of Larimer, State of Colorado, citizens of the United States, have invented a new and useful Improvement in Sight Water-Gages, of which the following is a specification.

The object of our invention is to connect the drain-cock of a water-gage with a time-recorder, so that when the cock is opened the time of such operation will be recorded.

With the above object in view our invention consists in combining with the drain-cock of a water-gage an electric time-recorder, a circuit-breaker being interposed, so as to make electric connections when the cock is turned.

In the accompanying drawings, which illustrate our invention, Figure 1 is a side elevation or diagram view showing the water-gage, circuit-breaker, electric time-recorder, and batteries. Fig. 2 is a detail view of the drain-cock of the water-gage, and Fig. 3 a sectional view of the pivot of the circuit-breaker.

The water-gage is provided with a sight-tube 5 and cocks 5ª and 5ᵇ, as well as a drain-cock 5ᶜ, these parts being of ordinary construction and connected to the boiler in the usual manner.

The drain-cock 5ᶜ has a turn-plug with a handle 6, said handle having members 6ª and 6ᵇ, preferably arranged at right angles with each other, the member 6ª being the grasping portion for turning the plug of the cock. The member 6ᵇ is connected by a rod 7 to an arm 9, said arm being mounted on a suitable plate or bracket 8, preferably of non-conducting material. The rod 7 is pivotally attached to the arm 9 by a suitably-attached pivot 9ᶜ, and the upper end of the arm is flattened, as shown at 3ª. To the plate 8 is attached a suitable contact-point 8ª, which carries a binding-post 8ᵇ.

10 designates a battery, and from said battery extends a wire 14, which is connected to the pivotal point of the arm 9, and to the binding-post 8ᵇ is connected a wire 15, which extends therefrom to one of the binding-posts of an electric time-recorder 12, the other binding-post of the recorder being connected to the battery by the wire 13.

By means of the construction hereinbefore described it will be observed that when the turning-plug of the drain-cock is moved so that the handle will be changed from the position shown in full lines to that shown in dotted lines, the rod 7 will be moved and throw the arm 9 to thus close the electric circuit, so that the time the plug of the drain-cock is turned will be indicated and a record of the opening of the drain-cock made.

It is obvious that any suitable circuit-breaker may be substituted for that herein shown, and the electric time-recorder is of the usual type, that herein illustrated being similar or of the same type as that patented to Harry T. Johnson August 14, 1894, No. 524,386, our improvement being a sight water-gage for steam-boilers which is so connected with an electric time-recorder that the person in charge of the boiler or gage must follow the instructions as to the opening of the drain-cock of the water-gage as often as required, and will preserve a register of the time when the drain-cock is opened. The opening of the drain-cock should take place from time to time for the purpose of blowing out the water from the sight-gage, so that it may not become clogged, and the negligence of an attendant as to the proper care of the gage is a frequent source of accident, and, according to the condition of the water used, it is customary for the engineer or his assistant to blow off the water-gage at certain intervals.

Having thus described our invention, what we claim as new, and desire to secure by Letters Patent, is—

1. The combination of a water gage having a drain-cock the handle of which is provided with a projecting portion together with a circuit breaker, having a pivoted arm, a rod connected to the projecting portion of the handle of the drain cock and with one end of the pivoted arm of the circuit breaker, a contact point pivoted in the path of the arm, and a time-recorder, located in the electric circuit, the wires being connected to the contact point and to the stud upon which the pivoted arm is mounted substantially as shown and for the purpose set forth.

2. In combination with a sight water-gage having a drain-cock the turning-plug of which is provided with a projecting portion as shown, of a circuit breaker having an arm, a rod connecting the pivoted arm to the projecting portion of the drain-cock, a contact point positioned in the path of the arm of the circuit breaker, and an electric time-recorder, battery and connecting wires, attached to the stud or pivot of the arm of the circuit breaker and to a binding post attached to the contact point substantially as shown and for the purpose set forth.

EDWARD P. WELLS.
EDWARD R. HUBBARD.

Witnesses:
G. J. ROLLANDET,
JOHN ROLLANDET.